(12) United States Patent
Lindsay et al.

(10) Patent No.: US 9,822,253 B2
(45) Date of Patent: Nov. 21, 2017

(54) CROSS-LINKABLE THERMOPLASTIC POLYURETHANES

(75) Inventors: Chris Ian Lindsay, Tervuren (GB); Christina Marinus, Veltem-Beisem (BE); Hans Godelieve Guido Verbeke, Lubbeek (BE); Rene Alexander Klein, Hoegaarden (BE)

(73) Assignee: HUNTSMAN INTERNATIONAL LLC, The Woodlands, TX (US)

( * ) Notice: Subject to any disclaimer, the term of this patent is extended or adjusted under 35 U.S.C. 154(b) by 0 days.

(21) Appl. No.: 13/703,905

(22) PCT Filed: Jun. 14, 2011

(86) PCT No.: PCT/EP2011/059772
§ 371 (c)(1),
(2), (4) Date: Dec. 13, 2012

(87) PCT Pub. No.: WO2012/004088
PCT Pub. Date: Jan. 12, 2012

(65) Prior Publication Data
US 2013/0095253 A1 Apr. 18, 2013

(30) Foreign Application Priority Data
Jul. 5, 2010 (EP) .................................... 10168460

(51) Int. Cl.
| | |
|---|---|
| *B05D 3/02* | (2006.01) |
| *C08L 75/16* | (2006.01) |
| *C08F 290/06* | (2006.01) |
| *C08G 18/42* | (2006.01) |
| *C08G 18/66* | (2006.01) |
| *C08G 18/76* | (2006.01) |

(Continued)

(52) U.S. Cl.
CPC .......... *C08L 75/16* (2013.01); *C08F 290/067* (2013.01); *C08G 18/4238* (2013.01); *C08G 18/664* (2013.01); *C08G 18/7671* (2013.01); *C09D 175/16* (2013.01); *D06N 3/14* (2013.01); *C08G 2270/00* (2013.01); *D06N 2205/20* (2013.01); *D06N 2207/123* (2013.01); *D06N 2207/126* (2013.01); *D06N 2211/28* (2013.01)

(58) Field of Classification Search
CPC .............. C08F 290/067; C08G 18/664; C08G 18/4238; C08G 18/7671; C08G 2270/00; C09D 175/16; C08L 75/16; D06N 3/14; D06N 2205/20; D06N 2207/123; D06N 2211/28; D06N 2207/126
USPC .......................................................... 427/496
See application file for complete search history.

(56) References Cited

U.S. PATENT DOCUMENTS

| | | |
|---|---|---|
| 4,133,723 A | 1/1979 | Howard |
| 4,507,458 A | 3/1985 | Shiraki et al. |

(Continued)

FOREIGN PATENT DOCUMENTS

| | | |
|---|---|---|
| WO | 2006098352 A | 9/2006 |
| WO | WO 2007/144292 A | 12/2007 |

*Primary Examiner* — Robert S Walters, Jr.
(74) *Attorney, Agent, or Firm* — Huntsman International LLC; Lewis Craft

(57) ABSTRACT

The invention provides a cross-linkable mixture of thermoplastic polyurethanes and ethylenic unsaturated compounds and thermoset materials that can obtained therefrom. The invention also provides application of the cross-linkable mixtures and processes in a solvent-less coating process.

13 Claims, 1 Drawing Sheet

(51) Int. Cl.
*C09D 175/16* (2006.01)
*D06N 3/14* (2006.01)

(56) References Cited

U.S. PATENT DOCUMENTS

| | | | |
|---|---|---|---|
| 4,560,456 A | 12/1985 | Heil et al. | |
| 4,666,783 A | 5/1987 | Heil et al. | |
| 2002/0113334 A1* | 8/2002 | Matsuoka et al. | 264/152 |
| 2009/0197000 A1 | 8/2009 | Limerkens et al. | |
| 2009/0309220 A1 | 12/2009 | Katogi et al. | |

* cited by examiner

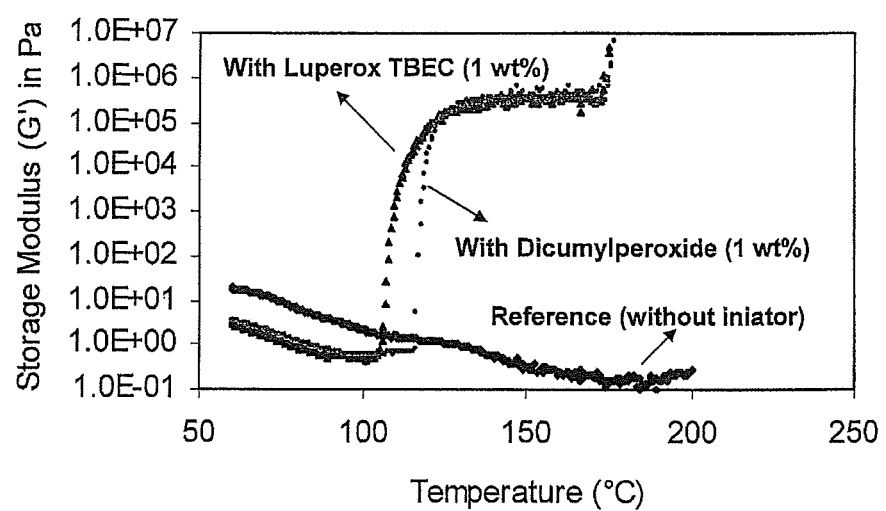

US 9,822,253 B2

CROSS-LINKABLE THERMOPLASTIC POLYURETHANES

CROSS-REFERENCE TO RELATED APPLICATIONS

This application is the National Phase of International Application PCT/EP2011/059772 filed Jun. 14, 2011 which designated the U.S. and which claims priority to European App. Serial No. 10168460.3 filed Jul. 5, 2010. The noted applications are incorporated herein by reference.

This invention relates to a cross-linkable mixture of thermoplastic polyurethanes and radically polymerizable compounds and the conversion thereof into a thermoset material that can be used in a coating process.

Thermoplastic polyurethanes (TPU's) are well-known, in particular, for their very high tensile and tear strength, high flexibility at low temperatures, extremely good abrasion and scratch resistance. TPU's are also known for their superior dynamic properties, in particular, very high rebound figures, low compression set and hysteresis loss. TPU's find application based upon their amenability to solution or melt processing into a versatile array of forms (for example films, tubes, complex molded shapes, coatings) via a broad range of techniques (for example extrusion, injection-molding, calendaring, solution coating).

A major technical challenge underlying thermoplastic polyurethanes is that although thermoplastic polyurethanes are relatively easy to process, the high temperature stability, durability, resistance to creep, (high temperature) dynamic behavior of these polyurethanes, as well as their stability in some commonly-used organic solvents, is less than might be desired for some applications. Moreover, using TPU's in coating applications often implies the use of solvents.

Polyurethane based synthetic leather coatings can be manufactured by different routes (lamination, direct calendering, direct coating and transfer coating). The technology most frequently used in these processes is a solvent born process. However, the industry directs development to move away from solvent based systems as there are major disadvantages that give rise to air and water pollution, operator's exposure to solvents, fire and flammable hazards and solvent (recycling) costs.

In view of the above, there is a continuing need for a polyurethane formulator to find a polyurethane-forming composition and process that meets the above challenges.

The object of the present invention is to provide a resin that can be used as a coating material which does not require the presence of a solvent whilst having good processability, fast linespeed and good mechanical properties of the final material after cross-linking. Another object of the invention is to obtain coating materials resulting from the aforementioned urethane based cross-linkable mixtures.

WO 2007/144292 discloses a cross-linkable elastomeric thermoplastic polyurethane that is functional radically polymerizable pendant groups free and has radically polymerizable groups at both ends and thermoset polyurethanes obtained therefrom. The thermoset elastomeric polyurethane comprises a mesophase separated polyurethane structure and has a molecular weight between cross-links from 12000 to 500000, preferably from 20000 to 200000.

U.S. Pat. No. 4,560,456 discloses magnetic recording media comprising an organic binder matrix being obtained by electron beam curing of a mixture of 70 to 90% by weight of a polyurethane acrylate polymer possessing polymerizable double bonds and from 10 to 30% by weight of one or more copolymerizable compounds. U.S. Pat. No. 4,666,783 discloses magnetic recording media comprising one or more magnetic layers consisting of an organic binder matrix containing finely divided magnetic material, said binder matrix being obtained by electron beam curing of a mixture of from 60 to 100 wt % of a polyurethane acrylate polymer and from 0 to 40 wt % of an acrylate monomer and/or acrylate prepolymer and/or an N-vinyl monomer. Both of these documents require the use of solvents in the preparation of the polyurethane acrylate polymer for molecular weights above 2000.

U.S. Pat. No. 4,507,458 discloses a urethane acrylate resin obtained by reacting a polyisocyanate with a polyester poyol, a low molecular weight polyol and a hydroxy alkyl acrylate. These urethane-acrylate resins are further incorporated with not more than 20 wt % of a compound of molecular weight less than 600 having not less than one radiation-crosslinkable, unsaturated double bond, as reactive diluent, to produce tough crosslinked products.

None of the documents cited above teaches or suggests the present invention.

The present invention provides a cross-linkable mixture comprising a thermoplastic polyurethane containing radically polymerizable unsaturated groups at the end of the TPU chain with a number average moleculair weight of 5,000 to 12,000, preferably between 5,000 and 10,000, most preferably between 5,000 and 8,000 and ethylenically unsaturated compounds (also called co-cross-linkers).

The invention also provides a cross-linkable mixture which comprises a thermoplastic polyurethane, obtainable by reacting one or more polyfunctional isocyanates, one or more polyfunctional polyols and one or more monols or monoamines comprising radically-polymerizable unsaturation(s), and one or more diol chain extenders, which is preferably urea free, isocyanurate free, oxazolinyl free, functional radically-polymerizable pendant group free, together with one or more ethylenically unsaturated compounds serving as reactive diluent (also called co-crosslinker) and forming part of the final cross-linked material.

The invention provides also a process for preparing a thermoset polyurethane based material, comprising the step of cross-linking a mixture of thermoplastic polyurethanes and ethylenically unsaturated compounds.

The invention also provides the use of said cross-linkable mixtures for preparing synthetic leather, adhesives, protective films, car coatings, extruded profiles and moulded articles and printing inks.

By controlling the molecular weight range, cross-linkable mixtures are provided with such sufficient viscosities that they can be used in a direct transfer process commonly utilised in synthetic leather production without using any solvent.

Other objects, features and advantages will become more apparent after referring to the following specifications.

BRIEF DESCRIPTION OF FIGURE

FIG. 1 is a graph showing rheology measurements on Example 4 in the presence of thermal cross-linking initiators compared to a reference without thermal cross-linking initiator.

The thermoplastic polyurethane (TPU) of the invention is preferably urea free, isocyanurate free, oxazolinyl free, polymerizable pendant group free with terminal functional groups on both ends of the polymer generated from the reaction of at least one difunctional isocyanate, at least one difunctional polyol and at least one monol or monoamine comprising ethylenically unsaturation, and at least one difunctional diol chain extender. The TPU is formed in the presence of a reactive diluent containing at least one ethylenically unsaturated compound. The cross-linking reaction of said cross-linkable mixture takes place after the process of applying the cross-linkable mixture onto a substrate. The invention offers substantial advantage in terms of the physical and chemical properties and in terms of processing.

As used herein, the term "thermoplastic" is used in its broad sense to designate a material that is reprocessable at an elevated temperature, whereas "thermoset" designates a material that exhibits high temperature stability without such reprocessability at elevated temperatures. As used herein the term "urea group free" is used to design a polymer backbone with less than 0.1% free urea groups available for reaction with other molecules. Similarly, the terms isocyanurate free and oxazolinyl free are used to design a polymer backbone with less than 0.1% free isocyanurate or oxazolinyl groups available for reaction with other molecules. As used herein the term "pendant group free" is used to design a polymer backbone having less than 0.01% of pendant groups containing polymerizable double bonds.

The reactants for forming a urethane linkage are generally selected from a difunctional isocyanate composition and at least one difunctional hydroxy compound, at least one monofunctional hydroxy or amine compound comprising radically polymerizable unsaturation(s) serving as chain stopper and at least one chain extender (typically a low molecular weight diol) in such amounts that the isocyanate index is generally between 80 and 110%, preferably between 96 and 102%.

The polyurethane thus synthesized incorporates unsaturated moieties at both polymer ends, has no pendant groups and is urea group free.

It should be clear that the term "polyurethane", as used herein, is not limited to those polymers which include only urethane or polyurethane linkages. It is well understood by those of ordinary skill in the art of preparing polyurethanes that the polyurethane polymers may also include allophanate, carbodiimide, uretidinedione, and other linkages in addition to urethane linkages.

The term "isocyanate index" as used herein is the ratio of isocyanate-groups over isocyanate-reactive hydrogen atoms present in a formulation, given as a percentage. In other words, the isocyanate index expresses the percentage of isocyanate actually used in a formulation with respect to the amount of isocyanate theoretically required for reacting with the amount of isocyanate-reactive hydrogen used in a formulation.

It should be observed that the isocyanate index as used herein is considered from the point of view of the actual polymer forming process involving the isocyanate ingredient and the isocyanate-reactive ingredients. Any isocyanate groups consumed in a preliminary step to produce modified polyisocyanates (including such isocyanate-derivatives referred to in the art as quasi- or semi-prepolymers) or any active hydrogens reacted with isocyanate to produce modified polyols or polyamines, are not taken into account in the calculation of the isocyanate index. Only the free isocyanate groups and the free isocyanate-reactive hydrogens present at the actual polymer forming stage are taken into account.

The modified TPU's are prepared from the starting materials for a thermoplastic polyurethane, i.e. polyols, polyisocyanates, chain-extending agents and chain stoppers containing unsaturation in the presence of a reactive diluent to an uncross-linked homogeneous polyurethane mixture.

The polyfunctional, preferably difunctional isocyanate composition may comprise any aliphatic, cycloaliphatic or aromatic isocyanates.

The polyisocyanate composition used in the process of the present invention may consist essentially of pure 4,4'-diphenylmethane diisocyanate or mixtures of that diisocyanate with one or more other organic polyisocyanates, especially other diphenylmethane diisocyanates (MDI), for example the 2,4'-isomer optionally in conjunction with the 2,2'-isomer. The polyisocyanate component may also be an MDI variant derived from a polyisocyanate composition containing at least 95% by weight of 4,4'-diphenylmethane diisocyanate. MDI variants are well known in the art and, for use in accordance with the invention, particularly include liquid products obtained by introducing carbodiimide groups into said polyisocyanate composition and/or by reacting with one or more polyols.

Preferred polyisocyanate compositions are those containing at least 90% by weight of 4,4'-diphenylmethane diisocyanate or its hydrogenated derivative. More preferably, the 4,4'-diphenylmethane diisocyanate content is at least 95% by weight, and most preferably at least 98% by weight.

The polyol, preferably diol used generally has a molecular weight of between 500 and 20000 and may be selected from polyesteramides, polythioethers, polycarbonates, polyacetals, polyolefins, polysiloxanes and, especially, polyesters and polyethers or mixtures thereof.

Polyether diols which may be used include products obtained by the polymerization of a cyclic oxide, for example ethylene oxide, propylene oxide, butylene oxide or tetrahydrofuran in the presence, where necessary, of difunctional initiators. Suitable initiator compounds contain 2 active hydrogen atoms and include water, butanediol, ethylene glycol, propylene glycol, diethylene glycol, triethylene glycol, dipropylene glycol, 1,3-propane diol, neopentyl glycol, 1,4-butanediol, 1,5-pentanediol, 2-methyl-1,3-propanediol, 1,6-pentanediol and the like. Mixtures of initiators and/or cyclic oxides may be used.

Polyester diols which may be used include hydroxyl-terminated reaction products of dihydric alcohols such as ethylene glycol, propylene glycol, diethylene glycol, 1,4-butanediol, neopentyl glycol, 2-methyl-1,3-propanediol, 1,6-hexanediol or cyclohexane dimethanol or mixtures of such dihydric alcohols, and dicarboxylic acids or their ester-forming derivatives, for example succinic, glutaric and adipic acids or their dimethyl esters, sebacic acid, phthalic anhydride, tetrachlorophthalic anhydride or dimethyl terephthalate or mixtures thereof.

Polycaprolactones and unsaturated polyesterpolyols should also be considered. Polyesteramides may be obtained by the inclusion of aminoalcohols such as ethanolamine in polyesterification mixtures.

Polythioether diols which may be used include products obtained by condensing thiodiglycol either alone or with other glycols, alkylene oxides, dicarboxylic acids, formaldehyde, amino-alcohols or aminocarboxylic acids.

Polycarbonate diols which may be used include those prepared by reacting glycols such as diethylene glycol, triethylene glycol or hexanediol with formaldehyde. Suitable polyacetals may also be prepared by polymerizing cyclic acetals.

Suitable polyolefin diols include hydroxy-terminated butadiene homo- and copolymers and suitable polysiloxane diols include polydimethylsiloxane diols.

Polyester diols, polyether diols and polycarbonate diols or mixtures thereof are preferred in the present invention.

Suitable low molecular weight (generally below 400) difunctional compounds that serve as chain extenders include diols, such as aliphatic diols like ethylene glycol, 1,3-propanediol, 2-methyl-1,3-propanediol, 1,4-butanediol, 1,5-pentanediol, 1,6-hexanediol, 1,8-octanediol, 1,9-nonanediol, 1,10-decanediol, 1,12-dodecanediol, 1,2-propanediol, 1,3-butanediol, 2,3-butanediol, 1,3-pentanediol, 2-ethyl-butanediol, 1,2-hexanediol, 1,2-octanediol, 1,2-decanediol, 3-methylpentane-1,5-diol, 2-methyl-2,4-pentanediol, 3-methyl-1,5-pentanediol, 2,5-dimethyl-2,5-hexanediol, 3-chloro-propanediol, 1,4-cyclohexanediol, 2-ethyl-2-butyl-1,3-propanediol, diethylene glycol, dipropylene glycol and tripropylene glycol, 1,4'-butylenediol, 3-hydroxy-2,2-dimethyl-propanoic acid, aminoalcohols such as ethanolamine, N-methyldiethanolamine and the like, diamines, hydrazines and hydrazides and mixtures thereof. Preferred are diols such as hexanediol, 1,4-butanediol or ethylene glycol. 1,4-Butanediol is most preferred. Diesters of terephthalic acid with glycols having 2 to 4 carbon atoms, e.g. terephthalic acid bis(ethylene glycol) or bis-1,4-butanediol, and hydroxyalkylene ethers of hydroquinone, and polyoxytetramethylene glycols having molecular weights of from 162 to 378, are also suitable.

Preferably the reaction mixture does not contain any low molecular weight triol.

Low molecular weight TPU's of the present invention are obtainable by using radically polymerizable unsaturated alcohols or amines as chain stoppers, preferably monofunctional alcohol or amine compounds containing an unsaturation such as polyalkylene glycol mono methacrylate, polyalkylene glycol mono acrylate, hydroxyethylacrylate, caprolactonemonoacrylate, hydroxyethylmethacrylate, dipentaerythritolpentaacrylate, 2-hydroxypropylacrylate, 2-hydroxypropylmethacrylate, 4-hydroxybutylacrylate, 4-hydroxybutylmethacrylate, 3-chloro-2-hydroxypropylacrylate, 6-hydroxyhexylacrylate and 6-hydroxyhexylmethacrylate, allylalcohol, 2-methyl-3-butene-2-ol and all hydroxy vinylethers such as e.g. cyclohexanedimethanolmonovinylether, diethyleneglycolmonovinylether and others. Most preferred are polyalkylene glycol mono methacrylates, polyalkylene glycol mono acrylates or combinations thereof.

The amount of chain stopper may be such that the molecular weight (MW) (measured as Mn) of the final TPU can be controlled and be comprised between 5,000 and 12,000. The amount of chain stopper is typically from 0.08 mmole/g of cross-linkable mixture to 0.35 mmole/g of cross-linkable mixture, preferably from 0.12 mmole/g of cross-linkable mixture to 0.25 mmole/g of cross-linkable mixture.

The said co-cross-linkable ethylenically unsaturated compounds which serve as a reactive diluent lie dormant during initial processing and polymerize if subjected to appropriate polymerization conditions. The co-cross-linker contains at least one polymerizable unsaturated group, preferably a radically polymerizable group. Examples of such ethylenically unsaturated compounds are dipentaerythritol penta acrylate, trimethylolpropane trimethacrylate, ditrimethylolpropane tri acrylate, pentaerythritol tetra acrylate, trimethylolpropane tri acrylate, butanediol di methacrylate, ethoxylated pentaerythritol tetra acrylate, hexanediol di methacrylate, hexanediol di acrylate, lauryl methacrylate, 2-phenoxyethyl methacrylate, 2-phenoxyethyl acrylate, polyethyleneglycol di acrylate, polypropyleneglycol di acrylate, polycaprolactone di acrylate. Most preferred are mono acrylates and mono methacrylates or combinations thereof.

The mixing of the reactants with the co-cross-linkable radically polymerizable compounds may be carried out using any suitable mixing device followed by a batch or continuous polymerization process carried out at a temperature at which no or only partial cross-linking occurs.

The invention allows controlling the viscosity of the cross-linkable mixture by adjusting the relative amounts of the TPU and the said ethylenically unsaturated compounds, the latter serving as a reactive diluent and forming part of the final cross-linked material. Generally the amount of TPU is between about 45 and 70 wt % and the amount of ethylenically unsaturated compounds is between about 55 and 30 wt % based on the total cross-linkable mixture. Preferably the amount of TPU is between 45 and 60 wt % and the amount of ethylenically unsaturated compounds is between 55 and 40 wt %.

The ratio of TPU and co-cross-linker, the hard block content of the TPU, the molecular weight (Mn) of the TPU and the type of chain stopper is chosen in such a way that the viscosity of the cross linkable mixture of the invention has a value between about 5 and 200 Pas, preferably between 5 and 100 Pas, at a temperature of a value within the range 20 to 80° C.

The invention also allows controlling the hard block content of the TPU that is used in the invention; especially one can control the processing and final use temperature of the final products in addition to the thermomechanical performance. The hardness of the materials of the invention can be varied by changing the amount of hard block level in the thermoplastic polyurethane. Typically, the hard block level is varied between 7 and 60 wt % with hard block level being defined as the weight percentage of chain extender, chain stopper and isocyanate in the TPU; preferred values are from 10 to 50 wt %.

Generally the number of urethane groups per kg of acrylate resin is between 0.5 and 2.5 and preferably between 0.5 and 1.5.

Other conventional ingredients (additives and/or auxiliaries) may be used in making the thermoplastic polyurethanes. These include catalysts, surfactants, flame proofing agents, fillers, pigments, stabilizers and the like.

Catalysts which enhance the formation of urethane and urea bonds may be used, for example, tin compounds, such as a tin salt of a carboxylic acid, e.g. dibutyltin dilaurate, stannous acetate and stannous octoate; amines, e.g dimethylcyclohexylamine and triethylene diamine.

The polyurethane chains are obtained by classical methods known in the art (see for example Polyurethanes Handbook $2^{nd}$ edition, G. Oertel, 1994). The chains are notably obtained by the reaction of a polyisocyanate, an isocyanate-reactive compound (a polyol), a chain stopper and chain extender of the invention, in conditions such that no pendant groups and no urea group are obtained. One may revert for information on how to conduct synthesis processes in The Polyurethanes Book, D. Randall & S. Lee (Eds); Wiley, and especially Chapter 7, pp 113-123, Chapter 21, pp 314-330.

The reactants in the cross-linkable mixture forming the urethane linkage (the so-called TPU) according to the invention can be produced in the so-called one-shot, semi-prepolymer or prepolymer method known in the art by a batch or continuous process known to the person skilled in the art. The TPU's thus produced are dissolved into a reactive diluent, and can be processed according to known techniques.

All reactants can be reacted at once, or can be reacted in a sequential manner into the reactive diluent. By prior mixing of all or part of the unsaturated chain stopper of the invention with all or part of the isocyanate-reactive compounds solutions or suspensions or dispersions are obtained, depending on the unsaturated chain stopper and isocyanate-reactive compounds used. The various components used in the manufacture of the compositions of the invention can in fact be added in any order.

For example, one may use a prepolymer of polyisocyanate and polyol, then add the diol and the monol, or one may use a prepolymer of polyisocyanate and polyol and the monol, then add the diol. The co-cross-linker can be present from the start or added during the process in order to control the viscosity.

A major advantage of the present invention compared to prior art processes is the fact that the present process can be carried out in the absence of any additional non-reactive solvent.

Cross-linking can be initiated either via the thermal route or via the actinic route, including UV and electron beam (EB) radiation.

Compounds suitable as thermal cross-linking initiators are organic peroxides such as dicumylperoxide, 2,5-dimethyl-2,5-di(tert.-butyl)peroxide, 2,5-Bis(tert.-butylperoxide)-2,5-dimethyl-3-hexyne, di-tert.-butylperoxide, 2,5-Bis(tert.-butylperoxide)-2,5-dimethyl-hexane, Bis(tert.-butylperoxyisopropyl)benzene, m-octadexylazoformate and tert.-butyl peroxycumene, tert.-butyl peroxy 2-ethylhexylcarbonate. A preferred cross-linker is tert.-butyl peroxy 2-ethylhexylcarbonate.

Another method for cross-linking is exposure to actinic radiation such as ultraviolet light or electron beam for an appropriate period of time.

Typical UV initiators comprise ketones such as 1-hydroxycyclohexylphenylketone, 2,2-dimethoxy-1,2-diphenylethan-1-one, 1-[4-(2-hydroxyethoxy)-phenyl]-2-methyl-1-propanone (HHPMP), and (bis)acylphosphineoxides such as bis(2,4,6-trimethylbenzoyl)-phenyl-phosphoneoxide (BTPPO).

Another aspect of the invention is the use of stabilizers to inhibit the thermal reaction of the unsaturated polymerizable groups during melt processing. The occurrence of such reactions can lead to undesirable consequences such as the formation of gels in the processed thermoplastic or the generation of an intractable thermoset before the material has been processed into the desired form. It has been found that the use of a number of classes of stabilizer which inhibit radical formation or act as radical scavengers can prove effective in inhibiting the onset of thermal cross-linking of the TPU's via retarding the thermal reaction of the unsaturated polymerizable groups. One such class of stabilizers is hindered phenols (which are traditionally used as antioxidants) and/or thermal stabilizers. Examples of such compounds are families of phenolic compounds such as 2,6-dialkyl phenols (e.g. 2,6-di-tert-butyl-4-methylphenol), alkylated hydroquinones (e.g. 2,5-di-tert-butyl-hydroquinone), alkylidene bisphenols (e.g. 2,2'-methylene-bis-(6-tert.-butyl-4-methylphenol)). These are commercially available under the "Irganox" trade name (e.g. Irganox 1010, Irganox 1076, Irganox 1135, Irganox 245). Another family of compounds useful in the current invention is Hindered Amine Light Stabilizers (HALS). These compounds are often used as light stabilizers but their radical scavenging mechanism also enhances thermal stability. Examples include bis(2,2,6,6-tetramethyl-4-piperidinyl)sebacate, other derivatives of 2,2,6,6-tetramethylpiperidine and derivatives of 1,2,2,6,6-pentamethylpiperidine. Examples of commercially available HALS include Tinuvin 770, Tinuvin 765, Tinuvin 622, Tinuvin 123 and Chimassorb 944.

In addition to the aforementioned classes of stabilizers, any family of compounds which is capable of inhibiting radical formation or scavenging radicals may thermally stabilize the unsaturated polymerizable groups. Such families of compounds also include phosphates, phosphonates, triazines, aromatic esters, aromatic amides and O-, N- and S-benzyl compounds.

The amount of stabilizer in compositions of the invention typically amount to 0.5-2%, most advantageously 1-2% by weight, i.e. an amount which is in some aspects greater than amounts used in prior art.

The present invention can also be used for the application of a coating to a substrate or impregnating a substrate with the cross-linkable mixture of the invention. In a second step the impregnated substrate may be irradiated to effect the cross-linking.

The present reactive diluent method is particularly suitable for the synthesis of synthetic leather coatings. Especially, it is possible to vary the concentration of the TPU in the reactive diluent, from low to high concentration with TPU's having a relatively low molecular weight. Low molecular weight TPU's can be present at higher concentrations, where the low molecular weight TPU is converted into a high molecular weight compound upon cross-linking.

The reactive diluent method is also suitable for the synthesis of TPU's to be used as modifiers for matrix resins. The resins may then have improved adhesion, less tendency to shrink and/or have greater flexibility compared to those resins modified with TPU's of the prior art. The reactive diluent method eliminates the requirement for a solvent and reduces the amount of VOC's.

The thermoset polyurethane based materials obtainable via the process of the present invention are also suitable for use in any application of thermoset elastomers including, for example, footwear, Cable & Wire or automotive applications.

Upon cross-linking there will be a chemical bond between the TPU and the (acrylic) polymer (at the interface with the interpenetrating polymer formed from the (mono)functionalized monomer). The TPU is also integrated into a polymer in an excellent manner. The covalent link is formed substantially exclusively at the end of the TPU chains which means that the phase structure and chain mobility of the TPU segment of the cross-linked material are not disadvantageously disturbed. The TPU chains contain hard blocks and soft blocks, and these blocks will align upon cross-linking. Since cross-linking is achieved only at the extremities, because there is no pendant group or other functional groups along the chain, the TPU chains will align in a manner of a ladder, forming the rungs of the ladder while the polymer formed upon cross-linking of the extremities (optionally with a co-cross-linker) will form the stiles of the ladder. By aligning along the "stiles", the hard blocks and the soft blocks will then form a mesophase. Hence the invention provides a thermoset polyurethane prepared from the compositions of the invention which incorporates a mesophase separated polyurethane structure (having the MW of the starting TPU) and in which the molecular weight between cross-links (Mc) is controlled by the molecular weights of the precursor thermoplastic polyurethane and, optionally, co-cross-linker. The number average moleweight Mc can be comprised between 5,000 and 12,000, preferably between 5,000 and 10,000, most preferably between 5,000 and 8,000. The number average moleweight can be calculated as known to those skilled in the art or by using standard software such as published by Oxford Materials Ltd (DryAdd Pro).

The invention is illustrated, but not limited, by the following examples in which all parts, percentages and ratios are by weight.

EXAMPLES

Materials

Diisocyanate: 4,4'-diphenyl methyl diisocyanate (Huntsman).
Polymeric diol: Daltorez P765 (Huntsman).
Low moleculair weight diol: 1,4-butanediol (Aldrich).
Radically polymerizable alcohol: Bisomer™ PEA6 (Cognis), Bisomer™ PPM5 (Cognis), Bisomer™ PPA6 (Cognis), Bisomer™ PEM63P (Cognis).
Radically polymerizable compounds: SR339 (Sartomer) or [MDI(PEM63P)$_2$] (see below).
Anti-oxidant: pentaerithritol tetrakis (3-(3,5-di-tert-butyl-4-hydroxyphenyl) propionate (Irganox 1010, Ciba Geigy).
Catalyst: Dibutyl tin dilaurate (Air Products).
Photo initiators: Hydroxy-cyclohexyl-phenyl-ketone (Irgacure 184, Ciba Geigy), Bis (2,4,6-trimethyl benzoyl)-phenylphosphineoxide (Irgacure 819, Ciba Geigy).
Thermal initiators: tert-butyl peroxy 2-ethylhexylcarbonate (Luperox TBEC, Arkema), Dicumyl peroxide (Aldrich).

Synthesis Procedure.

The cross-linkable mixture was prepared in a 500 ml reaction vessel with a 4-neck lid, equipped with a stirrer, a thermocouple, an addition funnel and nitrogen. The diisocyanate was introduced first and heated till 80° C. by an oil bath. The radically polymerizable alcohol was added with a plastic pipette dropwise in 10 min and left to react completely for 2 h. Then a mixture of polymeric diol and anti-oxidant was added with a dropping funnel. In this stage a catalyst was added and allowed to react completely. The oil bath was put on 70° C. and the addition of the low moleculair weight diol with a plastic pipette was started. During and after this the radically polymerizable compound was added. After addition of all the components the polymerizable mixture was left in an oven on 50° C. for 15 hours to complete the reaction. After this the photo-initiators Irgacure 184 (0.02 wt %) and 819 (0.01 wt %) were added. This was mixed for 5 minutes and air bubbles were removed by vacuum. Then the cross-linkable mixture was poured into a mould and cooled to room temperature and UV-cured.

Radically polymerizable compound [MDI(PEM63P)$_2$] (as used in example 2, 3 and 6) was prepared as follows. In a 500 ml 3 neck round-bottom glass flask equipped with stirrer, thermocouple and addition funnel the radically polymerizable alcohol (Bisomer™ PEM63P, 241.6 g) was added together with 1 drop of dibutyl tin dilaurate catalyst with a glass pipette (0.01 wt %). MDI (58.73 g) was added in the flask slowly with heated dropping funnel. The flask was heated in an oil bath (80° C.). The temperature of the mixture was kept at 80° C.±5° C. for 2 h. The experiment was carried out under a nitrogen atmosphere.

Cross-Linking:

Cross-linking can be done via a thermal route or via actinic radiations such as electron beam or ultra violet (UV) light. For the route via UV a photo initiator, typically those known to those skilled in the art, is added to the reactive mixture. For the thermal route peroxide initiators, those know to the man skilled in the art, are added to the reactive mixture.

UV Curing:

The samples 1-6 were UV-cured by irradiation with a Fusion UV system LC6E equipped with a Fusion I300 & I6 ultraviolet lamp. The speed was set at 5 m/min. The samples received 2 passes at both sides. The composition of the UV light for 1 pass was as follows:

|       | J/cm$^2$ | W/cm$^2$ | Wavelength (nm) |
|-------|----------|----------|-----------------|
| UV(A) | 2.59     | 5.27     | 250-260         |
| UV(B) | 0.77     | 1.63     | 280-320         |
| UV(C) | 0.086    | 0.205    | 320-390         |
| UV(V) | 2.44     | 5.01     | 395-445         |

Testing.

Viscosity

Viscosity of the cross-linkable mixtures before UV curing was measured using a Brookfield R/S 2000 rheometer. A controlled shear stress (CSS) measurement, from 0 to 100 Pa in 1 minute, a hold of 1 minute and from 100 to 0 Pa was executed. Viscosity was calculated from the hold run.

Tensile Test

The test is done according to DIN 53504 at a speed of 100 mm/min on samples after UV curing of the cross-linkable mixtures. Sample width and thickness is 6 mm and aproximately 4 mm respectively (the latter is measured on each sample).

Dynamic Mechanical Analysis

DMA measurements were done with a TA Q800 apparatus on samples after UV curing of the cross-linkable mixtures. The instrument is equipped with a small dual cantilever clamp. The samples (2 cm, 0.4 cm, ±0.2 cm) were scanned during temperature sweep from –80 to 120° C. at 3° C./min. The amplitude was at 20 mm and frequency 1 Hz.

Rheometry

The rheometer which was used is a TA Instruments Advanced AR2000. It has a chamber with a closed environment, which contains two disposable aluminum parallel plates. The top plate has a diameter of 25 mm and base plate has a diameter of 40 mm and the sample material is placed in between. A temperature sweep from 60° C. to 200° C., a strain of 1% and a normal force of 5N was used.

Formulations.

TABLE 1

Compositions of the cross-linkable mixtures (in gram) of examples 1-6.

| Component | Name | Ex. 1 | Ex. 2 | Ex. 3 | Ex. 4 | Ex. 5 | Ex. 6 |
|-----------|------|-------|-------|-------|-------|-------|-------|
| Diisocyanate | MDI | 12.6 | 10.8 | 13.1 | 10.7 | 13.8 | 9.2 |
| Polymeric diol | Daltorez P765 | 34.9 | 32.7 | 39.1 | 32.4 | 45.1 | 27.6 |
| Low moleculair weight diol | 1,4-butanediol | 2.3 | 2.0 | 2.3 | 1.9 | 2.4 | 1.7 |
| Radically polymerizable unsaturated alcohol | Acrylate1[a] | 6.0 | 5.2 | 6.2 | 5.2 | 8.2 | 5.5 |
| Ethylenic unsaturated compound | Acrylate2[a] | 44.3 | 49.4 | 39.2 | 49.7 | 30.4 | 56.1 |

[a]See table 2

TABLE 2

Identification of co-cross-linkers used in examples 1-6

| Example | Acrylate 1 | Acrylate 2 |
|---------|------------|------------|
| 1 | Bisomer ™ PEA6 | SR339 |
| 2 | Bisomer ™ PEA6 | MDI(PEM63P)$_2$ |

TABLE 2-continued

Identification of co-cross-linkers used in examples 1-6

| Example | Acrylate 1 | Acrylate 2 |
|---|---|---|
| 3 | Bisomer ™ PEA6 | SR339/MDI(PEM63P)$_2$ (50/50 g/g) |
| 4 | Bisomer ™ PPM5 | SR339 |
| 5 | Bisomer ™ PPA6 | SR339 |
| 6 | Bisomer ™ PPA6 | MDI(PEM63P)$_2$ |

TABLE 3

Calculated properties of the compositions of examples 1-6

| Example | mmol radically polymerizable alcohol/ g cross-linkable mixture | Hard block content (wt %) | Mc |
|---|---|---|---|
| 1 | 0.18 | 37 | 6000 |
| 2 | 0.15 | 36 | 5700 |
| 3 | 0.18 | 36 | 6400 |
| 4 | 0.14 | 36 | 6900 |
| 5 | 0.20 | 35 | 6100 |
| 6 | 0.13 | 37 | 5900 |

Experimental Results

TABLE 4

Test results on materials made from examples 1-6

| Ex. | Viscosity @60 C. [Pas] | Young's Modulus [MPa] | Tensile [MPa] | Elongation [%] | Storage modulus @25 C., [MPa] | Tg [C.] |
|---|---|---|---|---|---|---|
| 1 | 14.8 | 1.6 | 2.7 | 156 | 3.1 | 15.1 |
| 2 | 29.2 | 4.5 | 1.3 | 31 | 7.3 | 9.1 |
| 3 | 25.7 | 3.7 | 2.4 | 72 | 6.5 | 11.9 |
| 4 | 8.0 | 1.1 | 1.9 | 154 | 4.5 | 10.7 |
| 5 | 10.9 | 1.3 | 1.4 | 127 | 8.4 | 8.0 |
| 6 | 40.1 | 4.7 | 2.1 | 45 | 10.3 | 11.3 |

Thermal Curing

Example 4 was mixed with different thermal initiators (Dicumyl peroxide and Luperox TBEC, 1 wt %). Subsequently these samples were cured at 160° C. at different layer thickness (Luperox TBEC) as well as in a rotational disk rheometer with a temperature ramp (Luperox TBEC and Dicumyl peroxide). The results of the rheometer experiments are shown in FIG. 1 in which the storage modulus is plotted against temperature. It is demonstrated that the samples containing the thermal initiators can be readily cured at around 120° C. At 120° C. the storage modulus sharply increases indicating that the material starts to cross link. A reference material without initiator does not seem to cross link. Thermal cross linked samples were made with a thickness of 0.35 and 1.03 mm and these samples were mechanically tested. The results are shown in table 5. From these results it is clear that a flexible and strong thermoset material can be obtained via a thermal route using the cross linkable resins of the invention.

TABLE 5

Tensile tests of thermal cured sample of different thickness (example 4) in the presence of Luperox TBEC (1 wt %)

| | 1 | 2 |
|---|---|---|
| Thickness (mm) | 0.35 ± 0.06 | 1.03 ± 0.11 |
| Tensile Strength at Break (kPa) | 1169.7 | 1657.5 |
| Tensile Strength at Max Load (kPa) | 1235.1 | 1680.9 |
| Elongation (%) | 125.0 | 164.5 |
| Tensile Strength at 100% (kPa) | 940.2 | 836.4 |

The invention claimed is:

1. A cross-linkable mixture comprising ethylenically unsaturated compounds and a thermoplastic polyurethane with a number average molecular weight of 5000 to 10000, and wherein the thermoplastic polyurethane contains radically polymerizable unsaturated groups at ends of the thermoplastic polyurethane; wherein the thermoplastic polyurethane is urea-free, isocyanurate-free, oxazolinyl-free and functional radically-polymerizable pendant group free and is obtained by reacting one or more polyfunctional isocyanates, one or more polyfunctional polyols, one or more monofunctional alcohols or amines comprising radically-polymerizable unsaturation(s) and one or more diol chain extenders; and wherein the mixture does not contain any additional non-reactive solvent; wherein the amount of alcohol or amine comprising radically polymerizable unsaturations is between 0.08 mmole and 0.35 mmole per gram of cross-linkable mixture; and wherein the amount of thermoplastic polyurethane is between 45 and 70% by weight and the amount of ethylenically unsaturated compound is between 30 and 55% by weight, based on the total cross-linkable mixture; and further wherein the thermoplastic polyurethane is obtained in the absence of a triol having a molecular weight less than 400.

2. The cross-linkable mixture according to claim 1, wherein the alcohol or amine comprising radically polymerizable unsaturations is selected from the group consisting of polyalkylene glycol mono methacrylates and polyalkylene glycol mono acrylates and combinations thereof.

3. The cross-linkable mixture according to claim 1, wherein said ethylenically unsaturated compound is selected from the group consisting of mono acrylates and mono methacrylates and combinations thereof.

4. The cross-linkable mixture according to claim 1, wherein the mixture has a viscosity of between 5 and 200 Pas at a temperature between 20 and 80° C.

5. The cross-linkable mixture according to claim 1, wherein the thermoplastic polyurethane has a hard block content between 7 and 60% by weight.

6. The cross-linkable mixture according to claim 1, wherein the thermoplastic polyurethane chain has a number average molecular weight of 5000 to 8000.

7. A method of preparing a cross-linkable mixture, comprising: a. providing at least one polyfunctional isocyanate; b. providing at least one polyfunctional polyol; c. providing at least one low molecular weight diol; d. providing at least one radically polymerizable unsaturated alcohol or amine; e. providing at least one ethylenically unsaturated compound; f. blending the compounds provided in steps a to e and reacting the compounds provided in steps a to d, wherein blending and reacting the compounds results in a thermoplastic polyurethane with a number average molecular weight of 5,000 to 10,000; wherein the method is carried out in the absence of any additional non-reactive solvent; wherein the amount of alcohol or amine comprising radically polymerizable unsaturations is between 0.08 mmole and 0.35 mmole per gram of cross-linkable mixture; and wherein the amount of thermoplastic polyurethane is between 45 and 70% by weight and the amount of ethylenically unsaturated compound is between 30 and 55% by weight, based on the total cross-linkable mixture; and further wherein the method is carried out in the absence of a triol having a molecular weight less than 400.

8. The method of preparing a cross-linkable mixture according to claim 7, wherein the thermoplastic polyurethane has a number average molecular weight of 5000 to 8000.

9. A process for preparing a thermoset material, comprising a step of cross-linking the mixture as defined in claim 1.

10. The process according to claim 9, wherein the cross-linking is initiated via a thermal route or via an actinic route.

11. A process for preparing a coating comprising a step of applying the cross-linkable mixture as defined in claim 1 onto a substrate and subsequent cross-linking onto said substrate.

12. The process according to claim 11, wherein the cross-linking is either thermal, ultraviolet or electron beam activated.

13. The process according to claim 11, wherein the coating is a synthetic leather coating.

\* \* \* \* \*